United States Patent
Falk (10) Patent No.: US 11,662,428 B2
(45) Date of Patent: May 30, 2023

(54) RADAR SYSTEM FOR JAMMED ENVIRONMENTS

(71) Applicant: SAAB AB, Linköping (SE)

(72) Inventor: Kent Falk, Gothenburg (SE)

(73) Assignee: SAAB AB, Linköping (SE)

(*) Notice: Subject to any disclaimer, the term of this patent is extended or adjusted under 35 U.S.C. 154(b) by 68 days.

(21) Appl. No.: 17/287,567

(22) PCT Filed: Oct. 25, 2018

(86) PCT No.: PCT/SE2018/051089
§ 371 (c)(1),
(2) Date: Apr. 22, 2021

(87) PCT Pub. No.: WO2020/085962
PCT Pub. Date: Apr. 30, 2020

(65) Prior Publication Data
US 2021/0389419 A1    Dec. 16, 2021

(51) Int. Cl.
G01S 7/36 (2006.01)
G01S 13/26 (2006.01)
G01S 13/87 (2006.01)

(52) U.S. Cl.
CPC ............... G01S 7/36 (2013.01); G01S 13/26 (2013.01); G01S 13/87 (2013.01)

(58) Field of Classification Search
CPC . G01S 7/36; G01S 13/26; G01S 13/87; G01S 7/2813; G01S 13/003
See application file for complete search history.

(56) References Cited

U.S. PATENT DOCUMENTS

| 5,225,838 A | 7/1993 | Kanter et al. |
| 5,410,316 A | 4/1995 | Brooks |

(Continued)

FOREIGN PATENT DOCUMENTS

| CA | 2135551 C | 5/1995 | |
| CA | 2135551 C * | 1/2005 | ........... G01S 7/2813 |

(Continued)

OTHER PUBLICATIONS

Matousek, Z. et al., "Algorithm for M-FSK Intrapulse Radar Signal Analysis"; 2014 International Radar Conference, Published Oct. 13, 2014, 4 pages.

(Continued)

*Primary Examiner* — Erin F Heard
*Assistant Examiner* — Kenneth W Good
(74) *Attorney, Agent, or Firm* — Sage Patent Group (57) ABSTRACT

A radar system and method for maintaining radar performance of radar system in jammed environment are provided. The radar system has main antenna arrangement for transmitting and/or receiving electromagnetic waves. Main antenna arrangement includes at least one main antenna element and at least one main electronics module for transmitting and/or receiving signals to/from at least one main antenna element. The system has auxiliary antenna arrangement for transmitting and/or receiving electromagnetic waves, auxiliary antenna arrangement includes at least one auxiliary antenna element and at least one auxiliary electronics module for transmitting and/or receiving signals to/from the at least one auxiliary antenna element. System has a controller connected to main antenna arrangement and to auxiliary antenna arrangement. Controller is configured to transmit first radar waveform from main antenna element, and transmit second radar waveform from auxiliary antenna element.

16 Claims, 4 Drawing Sheets

(56) References Cited

U.S. PATENT DOCUMENTS

| | | | | |
|---|---|---|---|---|
| 5,440,308 A | * | 8/1995 | Dybdal | .................. H04B 1/126 |
| | | | | 342/19 |
| 10,545,246 B1 | * | 1/2020 | Johnston | ............... G01S 5/0036 |
| 2011/0260920 A1 | * | 10/2011 | Dybdal | ................ H04B 7/0825 |
| | | | | 342/379 |

FOREIGN PATENT DOCUMENTS

| | | | | |
|---|---|---|---|---|
| EP | | 1159635 A2 | 12/2001 | |
| EP | | 1159635 B1 * | 4/2010 | ........... G01S 7/2813 |

OTHER PUBLICATIONS

International Search Report and Written Opinion dated Jun. 28, 2019 for International Patent Application No. PCT/SE2018/051089, 13 pages.

International Preliminary Report on Patentability dated Jan. 19, 2021 for International Patent Application No. PCT/SE2018/051089, 11 pages.

Extended European Search Report dated Apr. 25, 2022 for European Patent Application No. 18937667.6, 8 pages.

* cited by examiner

RADAR SYSTEM FOR JAMMED ENVIRONMENTS

CROSS-REFERENCE TO RELATED APPLICATIONS

This application is a 35 U.S.C § 371 national stage application for International Application No. PCT/SE2018/051089, entitled "RADAR SYSTEM FOR JAMMED ENVIRONMENTS", filed on Oct. 25, 2018, the disclosures and contents of which are hereby incorporated by reference in their entireties.

TECHNICAL FIELD OF THE INVENTION

The present invention relates to a radar system and method. More specifically, but not exclusively it relates to a radar system employing electronic counter-countermeasures.

BACKGROUND

Electronic warfare has been around since at least the beginning of the 20th century, but did not really play an important role in military warfare until World War II which introduced reliable, long-range radar systems. For the first time, it was possible for friendly forces to see the enemy from a distance without being detected. Naturally, this also lead to the emerging of new technologies to counter these radar systems, leading to the development of radar jamming and other deception technologies.

Radar jamming is, as mentioned, a common form of electronic countermeasures (ECM), where the purpose is to degrade the effectiveness of enemy radar systems. Generally, this is done by emitting radio signals at specific frequencies which reduce the ability of the radar system to detect and track objects in the operational environment. A common type of radar jamming includes transmitting strong signals that may enter a radar receiver through antenna side lobes and be interpreted as main lobe signals. Consequently, this results in false detections and angle errors.

As a remedy to this, side lobe blanking (SLB) or side lobe cancellation (SLC) has been used to mitigate these types of radar countermeasures. In more detail, side lobe blanking provides an effective way of suppressing such signals by employing an omnidirectional antenna (guard antenna) which is used for receiving a comparing signal. By comparing the signal strength as received by both the omnidirectional antenna and the main antenna, it is possible to determine which signals are not emanating from a region of interest, and can therefore be ignored. An example of a system employing side lobe cancellation can e.g. be found in U.S. Pat. No. 8,115,679 by the same applicant, SAAB AB in Sweden, incorporated herein by reference.

However, a problem with the above mentioned existing solutions is that jamming in the main-lobe is not mitigated, and they require significant computational capacity when used in a rotating antenna since the weighting coefficients for the main and guard antenna have to be updated very frequently. This latter problem is even more prominent during operation with wide instantaneous bandwidth.

There is accordingly a need for a new and improved radar system having electronic counter countermeasures, which can handle side lobe jamming as well as main-lobe jamming in an improved manner.

SUMMARY OF THE INVENTION

It is therefore an object of the present invention to provide radar system, a method for maintaining radar performance of a radar system in a jammed environment, a non-transitory computer-readable storage medium, and a vehicle having such a radar system which alleviate all or at least some of the above-discussed drawbacks of presently known systems.

This object is achieved by means of a radar system, a method, a non-transitory computer-readable storage medium, and a vehicle as defined in the appended claims.

The term exemplary is in the present context to be understood as serving as an instance, example or illustration.

According to a first aspect of the invention there is provided a radar system for detecting a target in an operating area, the radar system comprising:

a main antenna arrangement for transmitting and/or receiving electromagnetic waves, the main antenna arrangement comprising at least one main antenna element and at least one main electronics module for transmitting and/or receiving signals to/from the at least one main antenna element, wherein the main antenna arrangement is configured to emit a radiation pattern comprising a main lobe and a side lobe area;

an auxiliary antenna arrangement for transmitting and/or receiving electromagnetic waves, the auxiliary antenna arrangement comprising at least one auxiliary antenna element and at least one auxiliary electronics module for transmitting and/or receiving signals to/from the at least one auxiliary antenna element;

a controller connected to the main antenna arrangement and to the auxiliary antenna arrangement, the controller being configured to:

transmit a first radar waveform from the at least one main antenna element; and transmit a second radar waveform from the at least one auxiliary antenna element, and wherein the first radar waveform and the second radar waveform have a normalized cross-correlation factor below one.

Hereby presenting a radar system capable of more effectively mitigating detrimental effects of radar jammers targeting the side lobes of a radar system than conventionally known solutions. The "target" may for example be an enemy vehicle/aircraft comprising a radar jammer.

The term connected is in the present context to be understood as "operatively connected", i.e. directly or indirectly connected. The antenna arrangement may for example comprise, an active or passive electronically scanned array (ESA), however other realizations are feasible and within the scope of the invention (such as e.g. parabolic antennas, slotted waveguides, etc.). The radar system may for example be a Doppler radar system, a pulsed Doppler radar system, a Frequency-Modulated Continuous-Wave (FMCW) radar system, and so on.

The auxiliary antenna (arrangement) may in the following be referred to as a guard antenna (arrangement), and these terms are used synonymously and interchangeably in the present context. The radar system may for example be stationary, mounted on a vehicle (e.g. a truck-mounted radar) or provided in an aircraft.

Moreover, the term "radar waveform" is to be understood as an electromagnetic waveform suitable for radar applications. The frequency band for radar applications can range from 3 MHz to 300 GHz depending on a specific application, but are most common in the range from 40 MHz to 40 GHz. Stated differently, the term radar waveform may be understood as a waveform with an ambiguity function that has low side lobes in both range and Doppler. The radar waveforms may be continuous wave waveforms or pulsed waveforms. In the following, the term "illumination" will be used and should be construed as the process of directing radio waves towards one or more objects, even though radio waves are invisible to the human eye or optical cameras.

The present invention is at least partly based on the realization that instead of only using the auxiliary antenna (may also be referred to as the guard antenna) for a listening/receiving mode, one can use it actively and transmit a "believable" diversion signal onto which a jammer can lock. In more detail, by ensuring that both the main antenna signal as well as the auxiliary antenna signal are credible radar signals it is possible to realize a radar system having effective electronic counter-countermeasures. Moreover, by using credible radar signals/waveforms in the auxiliary antenna as well as the main antenna, it is less obvious for the jammer that the diversion signal is an actual diversion.

In other words, the present inventor realized that by radiating similar waveforms (having a high orthogonoality or low cross-correlation) from the main antenna and the guard antenna, one can create a trustworthy side lobe illumination which dominates over the main antenna side lobes, and thereby make a radar jammer "lock" onto the guard antenna instead. Thus, the presented radar system increases the probability for maintained radar performance even in jammed environments.

As previously mentioned, the first and second radar waveforms are preferably formed in such a way that each of them is individually useable as fully functioning radar modes. This may for example be achieved by employing two identical waveforms with the exception of having different carrier frequencies.

Thus, in accordance with an exemplary embodiment of the present invention, the first radar waveform has a first carrier wave and the second radar waveform has a second carrier wave, said first carrier wave being different from the second carrier wave. Alternatively, or additionally, the first radar waveform and the second radar waveform have different intrapulse modulations. Accordingly, by using different carrier waves for the two separate radar waveforms of the two antenna arrangements and/or different intrapulse modulations, a simple and effective means for achieving high orthogonality (low correlation) between the two waveforms is provided. Different carrier waves may for example be (sinus shaped) carriers waves having different frequencies. For example, controller may be configured to control the main antenna arrangement and the auxiliary antenna arrangement so to emit/transmit the same signal/waveform but with different carrier wave frequencies.

From an enemy radar jammer's perspective, it is (more strongly) illuminated by the "wrong" (i.e. guard antenna) for a majority portion of the time since the Effective Radiated Power (ERP) of the guard antenna exceeds the main antenna's ERP in the side lobe area/region. Thus, it is most likely that the radar jammer will maintain a lock onto the guard antenna. As the skilled reader realizes, the enemy radar jammer is illuminated simultaneously by both the main antenna and the guard antenna during each pulse (for a pulsed radar system) and continuously (for a CW radar system), but the ERP of the guard antenna exceeds that of the main antenna except for the main lobe. Thus, one can think of it as that the antenna with the highest ERP in the current direction only illuminates the jammer.

The guard antenna transmission is a pure deceptive transmission wherefore the jamming will not negatively affect the main antenna arrangement and the primary functionality of the radar system. However, for relatively short periods of time, the radar jammer will be illuminated by the main lobe of the main antenna, wherefore there is a probability that a "fast" radar jammer may realize that it is targeting the wrong antenna (e.g. jamming on the wrong frequency), and switch so to target the main antenna instead during these relatively short periods of time, which will impair the performance of the radar system. In a worst case scenario a fast and smart radar jammer may realize that it is being deceived and target only the main antenna instead. Thus, by introducing a different waveform during e.g. every other illumination or sweep, the enemy radar jammer will have a harder time realizing which one is the "primary" radar waveform and which one is the "deceptive" radar waveform. Naturally, the different waveform may be applied every third, every fourth, etc. sweep based on situation or preferences.

Further, in accordance with another exemplary embodiment of the present invention, the main antenna arrangement is adapted to sweep over the target with the main lobe, and wherein the controller is further configured to:

transmit a third radar waveform from the at least one main antenna element during every M:th sweep over the target, M being a positive integer >=2;

transmit the first radar waveform from the at least one main antenna element during the remaining sweeps over the target;

wherein the second radar waveform and the third radar waveform have a normalized cross-correlation factor above 0.5.

In other words, the radar system illuminates the target with the main beam every M:th illumination. The third radar waveform may for example be the second radar waveform.

Here, the second radar waveform and the third radar waveform are substantially similar, such that each of them are fully functional as a radar modes. This is in order to ensure that any potential radar jammer does not suspect that the second radar waveform (the one emitted by the guard antenna arrangement) is a diversion. This can for example be achieved by making the second radar waveform and the third radar waveform identical.

In for example a rotating antenna arrangement, the sweeps (may also be referred to as the main lobe illumination rate) may be construed as a rotation rate. Thus, in that case the main antenna arrangement has a rotation rate of N rotations per minute, where N>=2, and wherein the controller is further configured to:

transmit the third radar waveform from the main antenna during at least one rotation per minute out of the N rotations per minute (e.g. every 2:nd rotation), and transmit the first radar waveform from the main antenna during the remaining rotations out of the N rotations per minute;

the second radar waveform and the third radar waveform having a normalized cross-correlation factor above 0.5.

Further, in accordance with another exemplary embodiment of the present invention, the first radar waveform has a first carrier wave, the second radar waveform has a second carrier wave, and the third radar waveform has the second carrier wave, the first carrier wave being different from the second carrier wave. Moreover, alternatively or additionally, the first radar waveform and the second radar waveform may have different intrapulse modulations, while the third radar waveform and the second radar waveform have a common intrapulse modulation. Hereby providing a simple and efficient means for achieving the desired orthogonality relationships between the different radar waveforms.

Even further, in accordance with yet another exemplary embodiment of the present invention, the main electronics module comprises a matched filter for filtering the received signals from the main antenna element, wherein the matched filter is arranged to attenuate a returning second radar waveform which has been transmitted from the auxiliary antenna element by at least 20 dB. In other exemplary embodiment the matched filter can be arranged to attenuate the returning second radar waveform (which was originally transmitted by the auxiliary antenna) by at least 30 dB, such as e.g. at least 35 dB or least 40 dB. This elucidates the high orthogonality between the first radar waveform and the second radar waveform.

Moreover, in accordance with another exemplary embodiment of the present invention, the auxiliary antenna arrangement is arranged such that an effective radiated power, ERP, of the auxiliary antenna arrangement is higher than an ERP of the main antenna arrangement in the side lobe area of the main antenna arrangement (when the main antenna arrangement is transmitting electromagnetic waves). This is in order to ensure that the guard antenna arrangement has a protective functionality against side-lobe jamming. Naturally, the radar system may include a SLB or SLC functionality as well. This may for example be achieved by suitable control of antenna gain or a gain of subunits in the electronics modules (e.g. amplifier gain). Thus, in accordance with yet another exemplary embodiment of the present invention, the auxiliary antenna arrangement is arranged such that a gain of the auxiliary antenna arrangement is higher than a gain of the main antenna arrangement in the side lobe area of the main antenna arrangement (when the main antenna arrangement is receiving electromagnetic waves).

Further in accordance with a second aspect of the present invention, there is provided method for maintaining radar performance of a radar system in a jammed environment wherein the method comprises:

forming a first radar waveform;

transmitting the first radar waveform from a main antenna arrangement of the radar system;

forming a second radar waveform;

transmitting the second radar waveform from an auxiliary antenna arrangement of the radar system;

wherein the first radar waveform and the second radar waveform have a normalized cross-correlation factor below one. With this aspect of the invention, similar embodiments and advantages are present as in the previously discussed first aspect of the invention and vice versa.

In accordance with an exemplary embodiment of the present invention, the step of forming the first radar waveform comprises forming the first radar waveform using a first carrier wave; and the step forming the second radar waveform comprises forming the second radar waveform using a second carrier wave, the first carrier wave being different from the second carrier wave. The first carrier wave and the second carrier wave may for example have different frequencies.

Further, in accordance with yet another embodiment of the present invention, the step of forming the first radar waveform comprises forming the first radar waveform using a first intrapulse modulation scheme; and wherein the step of forming the second radar waveform comprises forming the second radar waveform using a second intrapulse modulation scheme, the first intrapulse modulation scheme being different from the second intrapulse modulation scheme. The controllable intrapulse modulation provides an alternative or complement to using different carrier waves in order to form two radar signals having a high level of orthogonality.

Further, in accordance with another aspect of the present invention, there is provided a non-transitory computer-readable storage medium storing one or more programs configured to be executed by one or more processors of a radar control system. The one or more programs comprising instructions for performing the method according to any one of the embodiments of the invention discussed in the foregoing. With this aspect of the invention, similar embodiments and advantages are present as in the previously discussed aspects of the invention.

Yet further, in accordance with yet another aspect of the present invention there is provided a vehicle comprising a radar system according to any one of the embodiments discussed with reference to the first aspect of the invention in the foregoing. With this aspect of the invention, similar embodiments and advantages are present as in the previously discussed first aspect of the invention. A vehicle is in this context considered to include surface vehicles as well as aircraft (e.g., fighter jets, helicopters, etc.)

These and other features and advantages of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION

In the following detailed description, some embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention.

Figure 1:
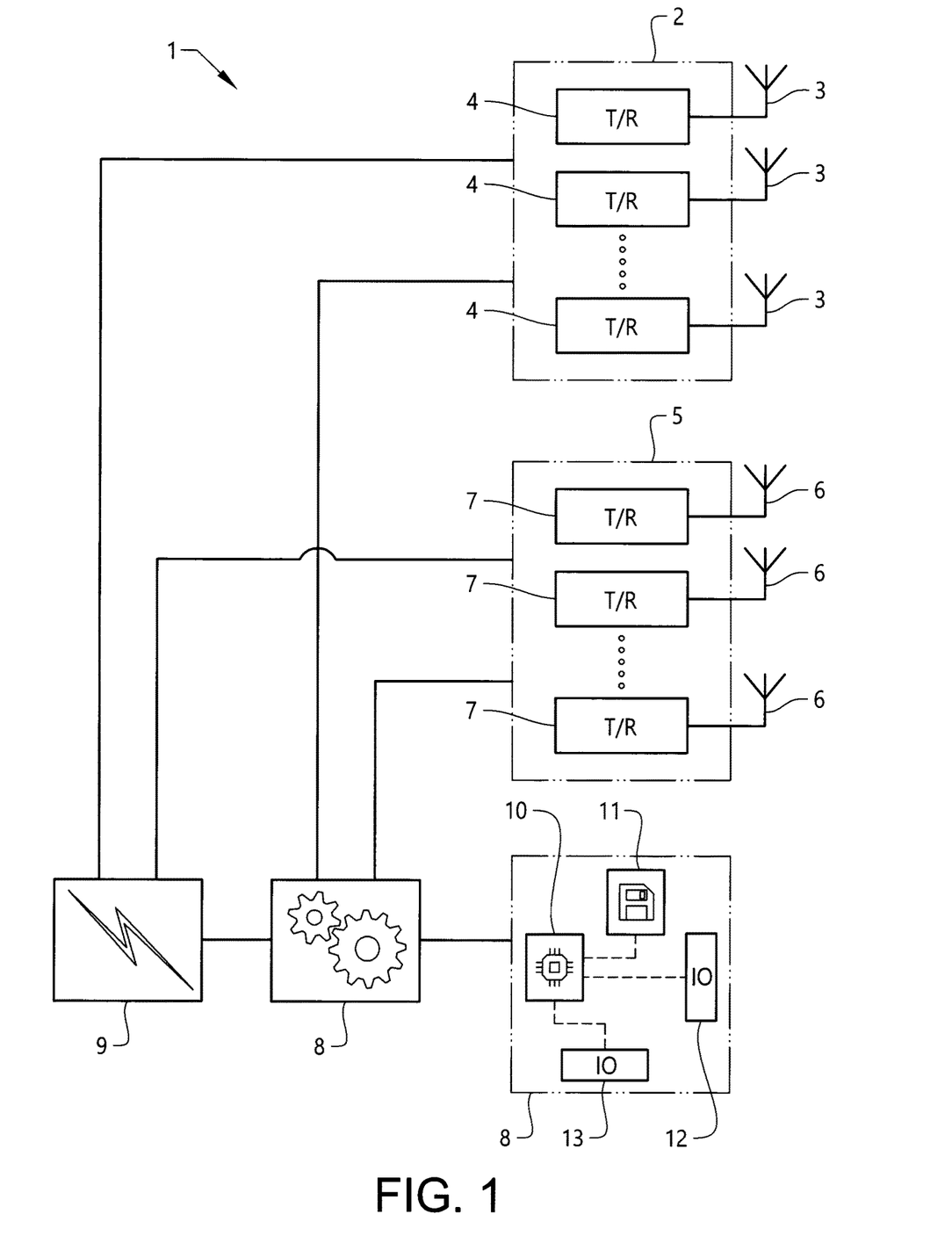
FIG. 1 is a schematic illustration of a radar system in accordance with an embodiment of the present invention.

FIG. 1 schematically illustrates a radar system 1 according to an embodiment of the present invention. The radar system 1 has a main antenna arrangement 2 and an auxiliary antenna arrangement 5. The auxiliary antenna arrangement 5 may also be referred to as a guard antenna arrangement. Both of the antenna arrangements 2, 5 are arranged to transmit and/or receive electromagnetic waves.

The main antenna arrangement 2 comprises a plurality of main antenna elements 3 and a plurality main antenna electronics modules 4 connected thereto. Analogously, the auxiliary antenna arrangement 5 comprises a plurality of auxiliary antenna elements 6 and a plurality of auxiliary electronics modules 7 connected thereto. The antenna elements may be a transmitting antennas or receiving antennas, however, often the same antenna is used for transmitting and receiving. The main antenna arrangement is furthermore configured so to emit a radiation pattern comprising a main lobe and a side lobe area (see e.g. ref, 21 and 22 in FIG. 2 and FIG. 3). Each electronics modules 4, 7 may for example include a transmitter (not shown) producing electromagnetic waves in the radio, microwaves, or millimetre wave domain, and a receiver (not shown) and processor to determine properties of the target(s). Radio waves (pulsed or continuous) from the antenna elements 3, 6 reflect off the target and return to the receiver, giving information about the target's location and velocity.

Moreover, each electronics module 4, 7 may further include a matched filter (not shown) for filtering the signals received by each associated antenna element 3, 6. The matched filters are generally provided in the receiver or receiving module of the electronics module 4, 7. The matched filters, among other things, serve to ensure that the electronics modules 4, 7 process no other electromagnetic signals, except for those emitted by the respective antenna elements 3, 6 and reflected of a target. In more detail, the matched filters of the main electronics modules are configured to attenuate signals which were originally transmitted from the auxiliary antenna arrangement. Preferably the matched filters of the main electronics modules are configured to attenuate the signals which were originally transmitted from the auxiliary antenna arrangement by at least 20 dB, or more preferably by at least 30 dB, such as e.g. at least 40 dB.

The radar system 1 further has a power supply 8 for supplying operating power to the radar system 1, and a controller 8 connected to each antenna arrangement 2, 5.

The controller 8 may for example be manifested as a general-purpose processor, an application specific processor, a circuit containing processing components, a group of distributed processing components, a group of distributed computers configured for processing, a field programmable gate array (FPGA), etc. The controller 8 may further include a microprocessor 10, microcontroller 10, programmable digital signal processor 10 or another programmable device. The controller 8 may also, or instead, include an application-specific integrated circuit (ASIC), a programmable gate array or programmable array logic, a programmable logic device, or a digital signal processor 10. Where the controller 8 includes a programmable device such as the microprocessor 10, microcontroller 10 or programmable digital signal processor 10 mentioned above, the processor 10 or an associated memory 11 may further include computer executable code that controls operation of the programmable device.

It should be understood that the controller 8 may comprise a digital signal processor arranged and be configured for digital communication with an off-site server or cloud based server. Thus, data may be sent to and from the controller 8, as readily understood by the skilled reader.

Further, it should be understood that parts of the described solution may be implemented either in the controller 8, in a system located external the controller 8, or in a combination of internal and external the controller 8; for instance in a server in communication with the controller 8, a so called cloud solution. For instance, communication signal may be sent to an external system and that external system performs the steps to determine the predicted position of a target and send back information indicating the predicted position and other relevant parameters used in tracking the target.

The processor 10 (of the controller 8) may be or include any number of hardware components for conducting data or signal processing or for executing computer code stored in memory 11. Accordingly, controller 8 may have an associated memory 11, and the memory 11 may be one or more devices for storing data and/or computer code for completing or facilitating the various methods described in the present description. The memory 11 may include volatile memory or non-volatile memory. The memory 11 may include database components, object code components, script components, or any other type of information structure for supporting the various activities of the present description. According to an exemplary embodiment, any distributed or local memory device may be utilized with the systems and methods of this description. According to an exemplary embodiment the memory 11 is communicably connected to the processor 10 (e.g., via a circuit or any other wired, wireless, or network connection) and includes computer code for executing one or more processes described herein.

Moreover, depending on functionality provided in the control circuitry one or more communication interfaces 12, 13 and/or one or more antenna interfaces (not shown) may be provided and furthermore, also one or more sensor interfaces (not shown) may be provided for acquiring data from sensors associated with the system.

Moving on, the controller 8 is configured to transmit a first radar waveform from the main antenna elements 3, and to transmit a second radar waveform from the auxiliary antenna elements 6. The second radar waveform being different from the first radar waveform such that they have a normalized cross-correlation factor below 1, such as e.g. below 0.9, below 0.8, below, 0.7, below 0.6, below 0.5, below 0.4 or below 0.3. In other words, the two radar waveforms have a high level of orthogonality.

The orthogonality between the first and second radar waveforms may for example be controlled by controlling the carrier wave used to modulate the radar waveform, and/or by controlling the intrapulse modulation of the two signals/waveforms.

The radar system 1 enables for using the auxiliary antenna arrangement 5 actively and transmit a "believable" diversion signal (in the form of the second radar waveform) onto which a jammer can lock, in addition to its basic side-lobe protective function. For the side-lobe protection, the auxiliary antenna arrangement 5 is preferably arranged such that an effective radiated power, ERP, of the auxiliary antenna arrangement 5 is higher than an ERP of the main antenna arrangement 2 in the side lobe area of the main antenna arrangement 2, when the main antenna arrangement is transmitting electromagnetic waves. Similarly, the auxiliary antenna arrangement 5 may be arranged such that a gain of the auxiliary antenna arrangement 5 is higher than a gain of the main antenna arrangement 2 in the side lobe area of the main antenna arrangement 2, when the main antenna arrangement 2 is receiving electromagnetic waves (listening mode).

Moving on, both the main antenna signal as well as the auxiliary antenna signal should be credible radar signals (i.e. it should not be obvious for the jammer that the diversion signal is a diversion), and at the same time, the two radar signals/waveforms should also have high orthogonality (i.e. low correlation).

The normalized cross-correlation between two waveforms $u_1$ and $u_2$ may for example be derived from the following formula:

$$\frac{\int u_1 \cdot u_2^* \, dt}{\sqrt{(\int |u_1|^2 dt) \cdot (\int |u_2|^2 dt)}} \quad (1)$$

In other words, by radiating similar waveforms from the main antenna elements 3 and the a guard antenna elements 6, one can create a trustworthy side lobe illumination which dominates over the main antenna side lobes, and thereby make a radar jammer "lock" onto the guard antenna instead.

As previously mentioned, the first and second radar waveforms are formed in such a way that each of them is individually useable as fully functioning radar modes. This may for example be achieved by employing two identical waveforms with the exception of having different carrier frequencies.

During use, the main antenna arrangement 2 will sweep over a target with its main beam with a main beam illumination rate. In a rotating antenna arrangement, this may be construed as the antenna rotation rate.

In more detail, in those brief time intervals when the main beam of the main antenna sweeps over the target, the output power of the main antenna arrangement 2 will exceed the output power of the auxiliary antenna arrangement 5. Thus, an "enemy" radar jammer may during those brief time intervals be hit by the main antenna arrangement 2 instead of the auxiliary antenna arrangement 5 (which is the purpose of the auxiliary antenna arrangement). In that scenario, a "fast" jammer may switch to target the main antenna arrangement and block the receiver of the main antenna arrangement 2 with highly concentrated energy signals during that time. In a worse scenario, a "smart" jammer may realize that it is being deceived since it does not experience a main lobe illumination in the frequency that it is jamming (auxiliary antenna frequency), and adjust accordingly.

Therefore, the controller 8 may be configured to transmit a third radar waveform from the main antenna arrangement 2 during every M:th sweep over the target, M being a positive integer equal to or above two, and to transmit the first waveform from the main antenna arrangement 2 during the remaining sweeps. The third radar waveform is here supposed to have a low orthogonality with the second radar waveform (from the auxiliary antenna arrangement 5), i.e. a cross-correlation factor above 0.5, preferably above 0.7, above 0.8 or more preferably above 0.9.

For example, the radar system 1 may be arranged such that the main antenna arrangement 2 transmits the same radar waveform/signal as the auxiliary antenna arrangement 5 (e.g. using the same carrier frequency) every other sweep/rotation. Thereby, the target/jammer will be illuminated by the real signal every other sweep/rotation and by the deceptive signal the remaining sweeps/rotations. Moreover, the illumination rate or rotation rate of the main antenna arrangement may be doubled in order to ever further mimic/simulate the radar signature that the radar system is supposed to be associated with.

Figure 2:
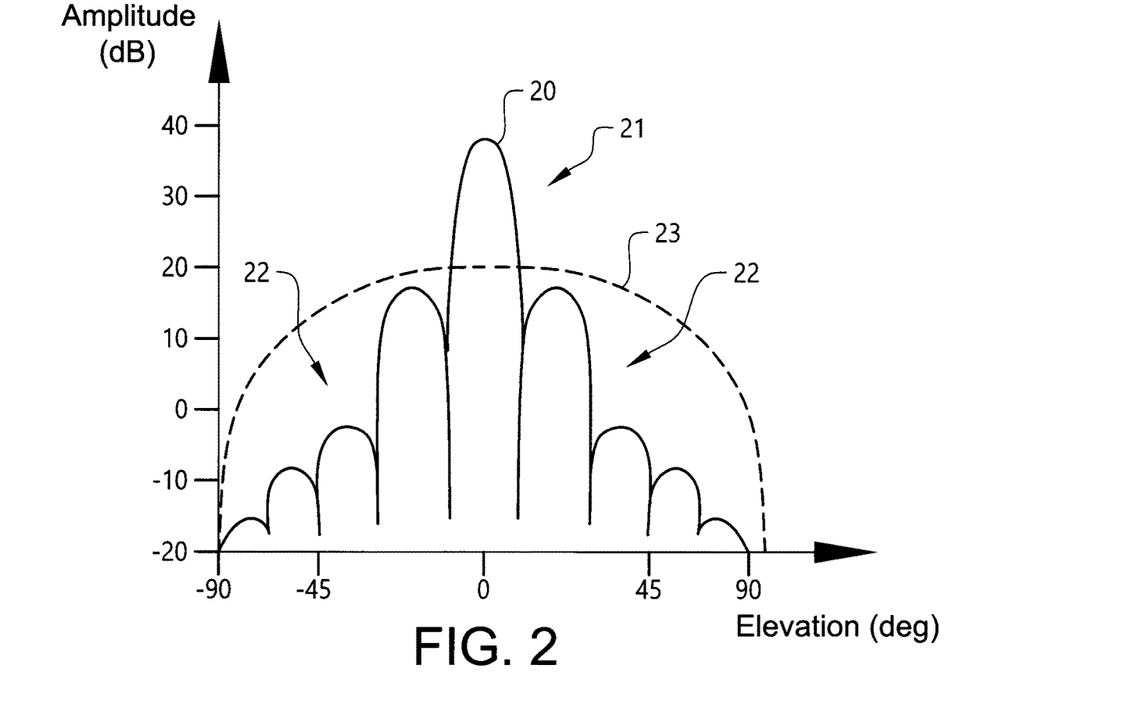
FIG. 2 is a schematic power versus elevation angle plot illustrating antenna patterns associated with a radar system in accordance with an embodiment of the present invention.
Figure 3:
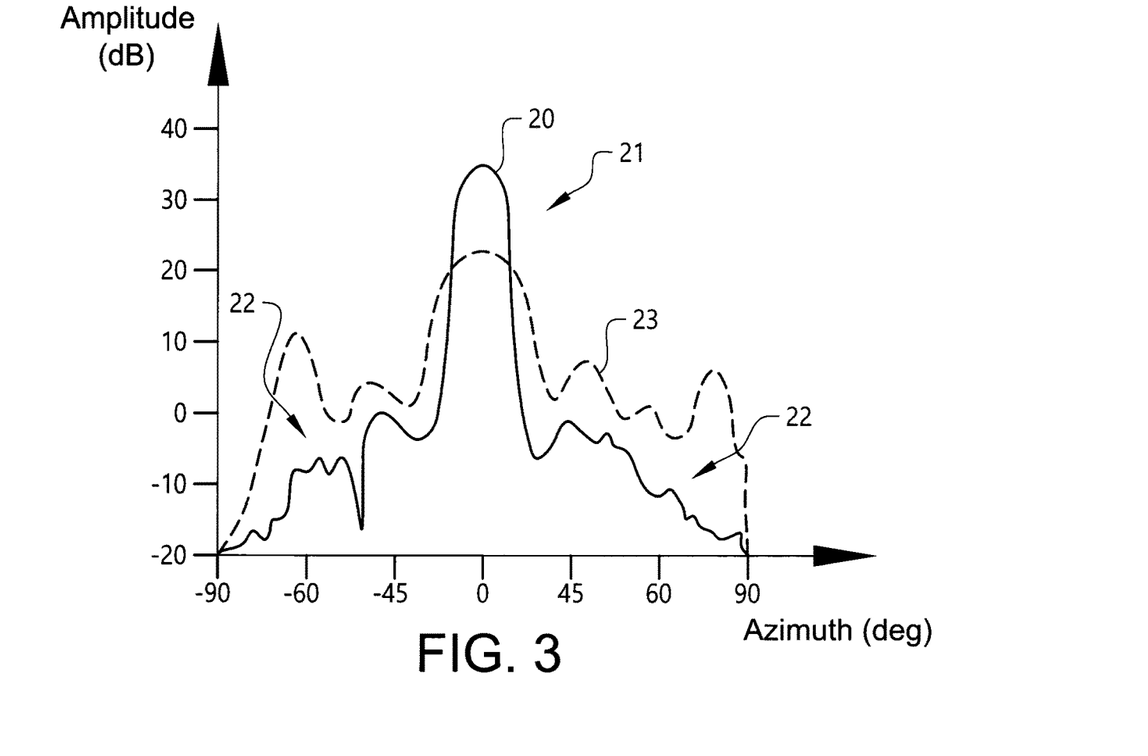
FIG. 3 is a schematic power versus azimuth angle plot illustrating antenna patterns associated with a radar system in accordance with an embodiment of the present invention.

FIGS. 2 and 3 show amplitude/power versus angle plots illustrating antenna patterns for an antenna system according to an embodiment of the present invention. The plots are two dimensional cross-sections of three dimensional pattern. FIG. 2 illustrates a main antenna pattern 20 and an auxiliary (guard) antenna pattern 23 in an elevation plane. The auxiliary antenna pattern 23 has a uniform distribution in the elevation plane, and covers the side lobe area 22 of the main antenna pattern 20. The gain of the auxiliary antenna arrangement exceeds that of the main antenna arrangement in the side lobe area. The amplitude of the main lobe 21 exceeds the amplitude of the auxiliary antenna pattern in the corresponding main lobe area.

FIG. 3 illustrates a main antenna pattern 20 and an auxiliary (guard) antenna pattern 23 in an azimuth plane. Here, the auxiliary antenna pattern has a random distribution with a superimposed Taylor distribution to cover the azimuth side-lobes of the main antenna pattern. Thus, the gain of the auxiliary antenna arrangement exceeds that of the main antenna arrangement in the side lobe area.

Figure 4:
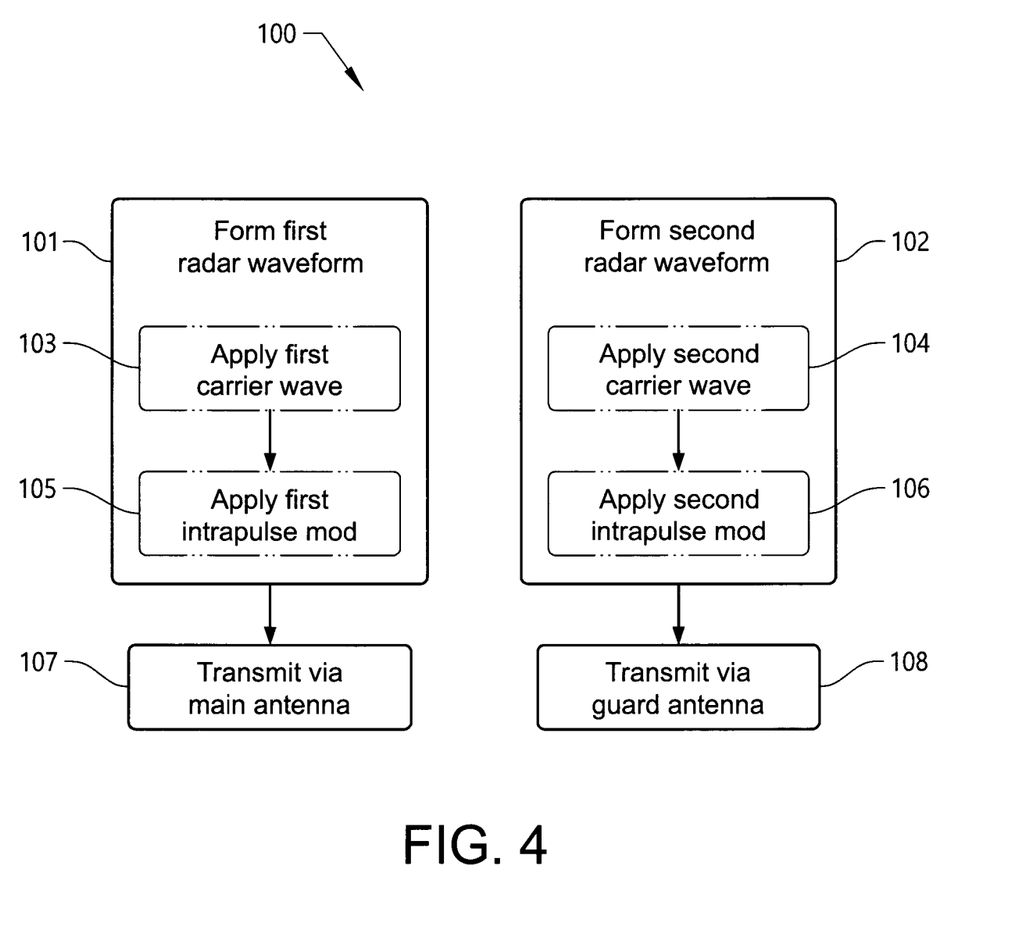
FIG. 4 is a schematic flow chart representation of a method for maintaining radar performance of a radar system in a jammed environment in accordance with an embodiment of the present invention.

Further, FIG. 4 illustrates a flow-chart representation of a method 100 for maintaining radar performance of a radar system in a jammed environment. The method comprises forming 101 a first radar waveform, and forming a second radar waveform 102. The two radar waveforms have a normalized cross-correlation factor below 1.0, preferably below 0.5. The two radar waveforms may be formed by applying 103 a first carrier wave and/or applying 105 a first intrapulse modulation, and applying 104 a second carrier wave and/or applying 106 a second intrapulse modulation to each wave respectively. Next, the formed radar waveforms are transmitted; such that the first radar waveform is transmitted 107 via the main antenna arrangement, and the second radar waveform is transmitted 108 via the auxiliary antenna arrangement.

Figure 5:
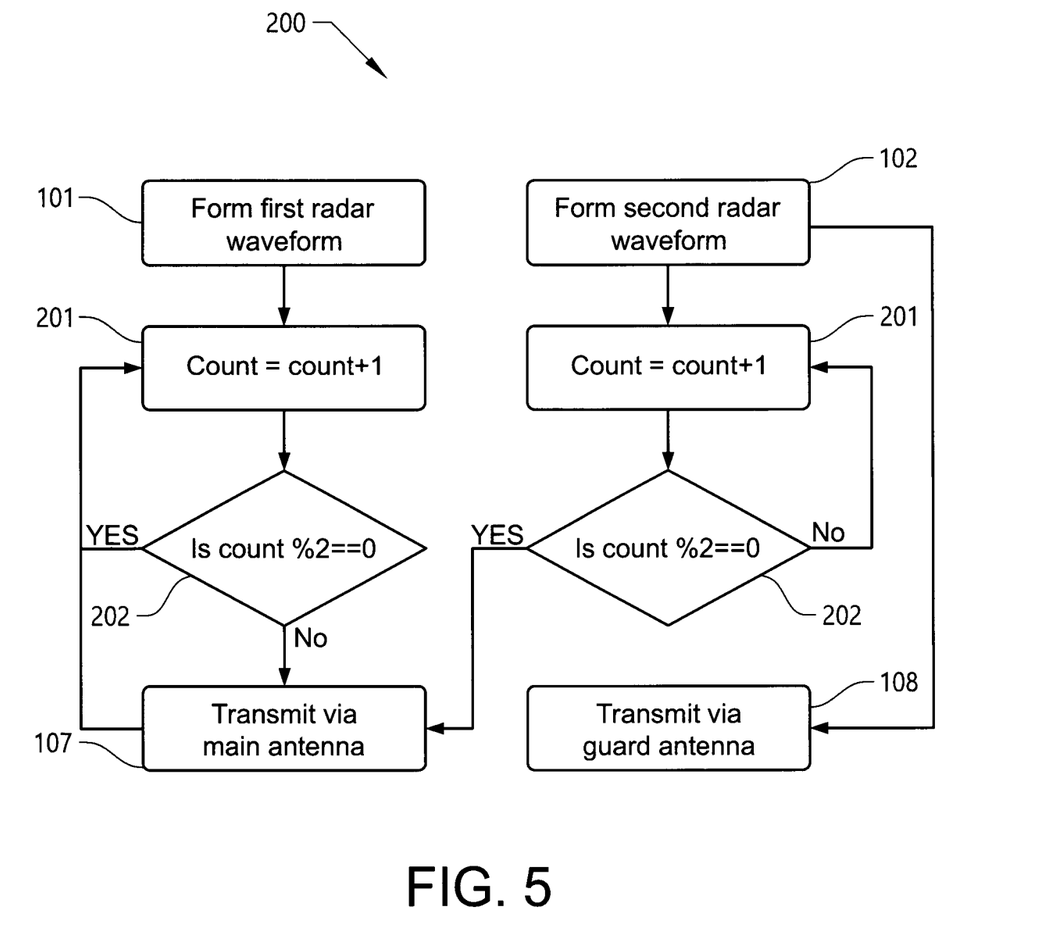
FIG. 5 is a schematic flow chart representation of a method for maintaining radar performance of a radar system in a jammed environment in accordance with an embodiment of the present invention.

FIG. 5 illustrates a flow-chart representation of a method 200 in accordance with another embodiment of the present invention. Here, the method 200 includes transmitting a "deceptive" signal also from the main antenna arrangement during a every other sweep/rotation of the main antenna arrangement. In more detail, the method includes forming 101 a first radar waveform and forming 102 a second radar waveform, the two radar waveforms having a low normalized cross-correlation factor (e.g. below 0.5). Next, a count is made 201 for every main beam illumination sweep of the main antenna arrangement. This may e.g. be an antenna rotation.

Thus, in accordance with the illustrated method 200 of FIG. 5, the count is increased 201 every sweep, and checked 202 if it is at an even number. Here, if the count is an even number the second waveform is transmitted 107 via the main antenna arrangement and transmitted 108 via the auxiliary/guard antenna arrangement. If the count is at an odd number, then the first radar waveform is transmitted 107 via the main antenna arrangement. In other words, the method includes transmitting the second radar waveform from the main antenna arrangement during every second sweep over the target, and transmitting the first radar waveform during the remaining sweeps over the target. Naturally, the deceptive transmission of the main antenna arrangement (i.e. the transmission of the second radar waveform) may be performed at any interval, such as e.g. every third sweep, every fourth sweep, and so on. Also, the method may include forming a third radar waveform which is transmitted from the main antenna arrangement every second sweep instead of the second radar waveform. The third radar waveform and the first radar waveform having a normalized cross-correlation factor below 1, such as e.g. below 0.7, or below 0.5. Moreover, the third radar waveform and the second radar waveform preferably have a normalized cross-correlation factor above 0.5, such as e.g. above 0.7 or above 0.8.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions. As already exemplified, some parts or all of the functions may be realized as a "cloud-based" solution.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent embodiments should be apparent for the person skilled in the art.

The invention claimed is:

1. A radar system for detecting a target in an operating area, the radar system comprising:

a main antenna arrangement for transmitting and/or receiving electromagnetic waves, the main antenna arrangement comprising at least one main antenna element and at least one main electronics module for transmitting and/or receiving signals to/from the at least one main antenna element, wherein the main antenna arrangement is configured to emit a radiation pattern comprising a main lobe and a side lobe area, wherein said main antenna arrangement is adapted to sweep over the target with the main lobe;

an auxiliary antenna arrangement for transmitting and/or receiving electromagnetic waves, the auxiliary antenna arrangement comprising at least one auxiliary antenna element and at least one auxiliary electronics module for transmitting and/or receiving signals to/from the at least one auxiliary antenna element; and a controller connected to the main antenna arrangement and to the auxiliary antenna arrangement, the controller being configured to:

transmit a first radar waveform from said at least one main antenna element; and transmit a second radar waveform from the at least one auxiliary antenna element, and wherein the first radar waveform and the second radar waveform have a normalized cross-correlation factor below 1.0, wherein the controller is further configured to:

transmit a third radar waveform from the at least one main antenna element during every M:th sweep over the target, M being a positive integer >=2; and transmit the first radar waveform from the at least one main antenna element during the remaining sweeps over the target;

wherein the second radar waveform and the third radar waveform have a normalized cross-correlation factor above 0.5, and wherein the first radar waveform and the third radar waveform have a normalized cross-correlation factor below 1.0.

2. The radar system according to claim 1, wherein the first radar waveform has a first carrier wave and the second radar waveform has a second carrier wave, said first carrier wave being different from the second carrier wave.

3. The radar system according to claim 1, wherein the first radar waveform and the second radar waveform have different intrapulse modulations.

4. The radar system according to claim 1, wherein M=2.

5. The radar system according to claim 1, wherein the first radar waveform has a first carrier wave, the second radar waveform has a second carrier wave, and the third radar waveform has the second carrier wave, said first carrier wave being different from the second carrier wave.

6. The radar system according to claim 1, wherein the first radar waveform and the second radar waveform have different intrapulse modulations, and wherein the third radar waveform and the second radar waveform have a common intrapulse modulation.

7. The radar system according to claim 1, wherein the main electronics module comprises a matched filter for filtering the received signals from the main antenna element, wherein the matched filter is arranged to attenuate a returning second radar waveform which has been transmitted from the auxiliary antenna element by at least 20 dB.

8. The radar system according to claim 1, wherein the auxiliary antenna arrangement is arranged such that an effective radiated power, ERP, of the auxiliary antenna arrangement is higher than an ERP of the main antenna arrangement in the side lobe area of the main antenna arrangement.

9. The radar system according to claim 1, wherein the auxiliary antenna arrangement is arranged such that a gain of the auxiliary antenna arrangement is higher than a gain of the main antenna arrangement in the side lobe area of the main antenna arrangement.

10. The radar system according to claim 1, wherein the third radar waveform and the second radar waveform are substantially similar.

11. A method for maintaining radar performance of a radar system in a jammed environment wherein the method comprises:
   forming a first radar waveform;
   transmitting the first radar waveform from a main antenna arrangement of the radar system;
   forming a second radar waveform;
   transmitting the second radar waveform from an auxiliary antenna arrangement of the radar system;
   transmitting a third radar waveform from the main antenna arrangement during every M:th sweep over a target, M being a positive integer >=2; and
   transmitting the first radar waveform from the main antenna arrangement during the remaining sweeps over the target,
   wherein the first radar waveform and the second radar waveform have a normalized cross-correlation factor below 1.0, and the second radar waveform and the third radar waveform have a normalized cross-correlation factor above 0.5, and wherein the first radar waveform and the third radar waveform have a normalized cross-correlation factor below 1.0.

12. The method according to claim 11, wherein forming the first radar waveform comprises forming the first radar waveform using a first carrier wave; and forming the second radar waveform comprises forming the second radar waveform using a second carrier wave, the first carrier wave being different from the second carrier wave.

13. The method according to claim 11, wherein forming the first radar waveform comprises forming the first radar waveform using a first intrapulse modulation scheme; and
   wherein forming the second radar waveform comprises forming the second radar waveform using a second intrapulse modulation scheme, the first intrapulse modulation scheme being different from the second intrapulse modulation scheme.

14. A non-transitory computer-readable storage medium storing one or more instructions configured to be executed by one or more processors of a radar control system, the one or more instructions comprising instructions for performing the method according to claim 11.

15. The method according to claim 11, wherein the third radar waveform and the second radar waveform are substantially similar.

16. A vehicle comprising a radar system, the radar system for detecting a target in an operating area, the radar system comprising:
   a main antenna arrangement for transmitting and/or receiving electromagnetic waves, the main antenna arrangement comprising at least one main antenna element and at least one main electronics module for transmitting and/or receiving signals to/from the at least one main antenna element, wherein the main antenna arrangement is configured to:
   emit a radiation pattern comprising a main lobe and a side lobe area, wherein said main antenna arrangement is adapted to sweep over the target with the main lobe;
   an auxiliary antenna arrangement for transmitting and/or receiving electromagnetic waves, the auxiliary antenna arrangement comprising at least one auxiliary antenna element and at least one auxiliary electronics module for transmitting and/or receiving signals to/from the at least one auxiliary antenna element; and
   a controller connected to the main antenna arrangement and to the auxiliary antenna arrangement, the controller being configured to:
   transmit a first radar waveform from said at least one main antenna element; and
   transmit a second radar waveform from the at least one auxiliary antenna element, and wherein the first radar waveform and the second radar waveform have a normalized cross-correlation factor below 1.0,
   wherein the controller is further configured to:
   transmit a third radar waveform from the at least one main antenna element during every M:th sweep over the target, M being a positive integer >=2; and
   transmit the first radar waveform from the at least one main antenna element during the remaining sweeps over the target; and
   wherein the second radar waveform and the third radar waveform have a normalized cross-correlation factor above 0.5, and wherein the first radar waveform and the third radar waveform have a normalized cross-correlation factor below 1.0.

* * * * *